(12) United States Patent
Florentino et al.

(10) Patent No.: US 6,470,037 B1
(45) Date of Patent: Oct. 22, 2002

(54) STIMULATED BRILLOUIN SCATTERING CELL HOUSING

(75) Inventors: Caesar C. Florentino, Palos Verdes, CA (US); Jerome A. Cadenasso, Redondo Beach, CA (US); Robert Tinti, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/461,440

(22) Filed: Dec. 14, 1999

(51) Int. Cl.[7] .................................................. H01S 3/10
(52) U.S. Cl. ............................................. 372/21; 372/9
(58) Field of Search ............................. 372/98–99, 101, 372/9, 21

(56) References Cited

U.S. PATENT DOCUMENTS

| | | | |
|---|---|---|---|
| 3,999,144 A | * 12/1976 | Bret ................................ 372/21 |
| 4,778,261 A | * 10/1988 | Boyd et al. ................... 359/300 |
| 4,791,644 A | * 12/1988 | Dube .............................. 372/3 |
| 4,875,219 A | * 10/1989 | Russell ......................... 372/92 |
| 4,958,908 A | * 9/1990 | Rockwell et al. ............ 359/300 |
| 5,434,942 A | * 7/1995 | Jackel et al. ................. 385/122 |
| 5,609,757 A | * 3/1997 | Schiavo et al. .............. 210/232 |
| 5,898,522 A | * 4/1999 | Herpst .......................... 359/511 |
| 5,982,801 A | * 11/1999 | Deak ............................. 372/69 |

* cited by examiner

*Primary Examiner*—Paul Ip
*Assistant Examiner*—James Menefee
(74) *Attorney, Agent, or Firm*—Harness, Dickey & Pierce, P.L.C.

(57) ABSTRACT

An SBS cell (20) for use in combination with a laser system (10) on a mobile platform. The SBS cell (20) includes inner and outer tubes (32, 34) that define inner and outer chambers (38, 40). The inner tube (32) is completely filled with an SBS fluid (76) and the outer tube (34) is filled to a level that is above the fill hole (42) of the inner tube (32). The outer tube (34) is sized to trap enough air to provide a compressible volume for cell fluid expansion from temperature changes in the laser environment. The SBS cell (20) is filled in an upside-down position, and the cell (20) is rotated 180° to its operating position. In this position, the fill hole (42) is pointed downward, and since the air bubbles float to the top, the distance between the inner tube fill hole (42) and the trapped air is sufficient enough to prevent air bubbles from migrating to the fill hole (42) and entering the inner tube (32). Without air bubbles within the inner tube (32), fluid sloshing from vibrations does not affect the optical beam.

12 Claims, 2 Drawing Sheets

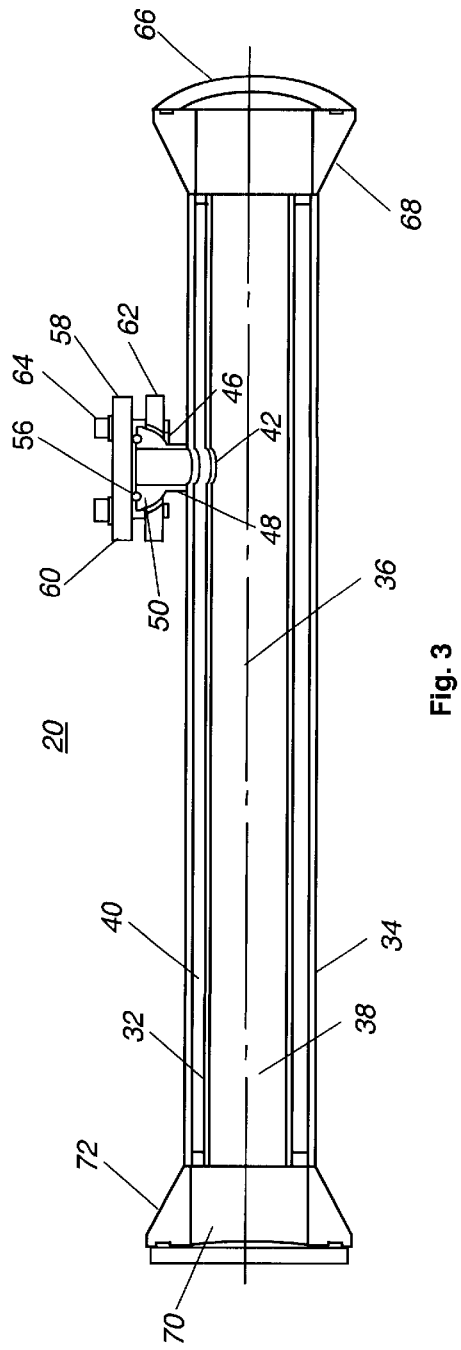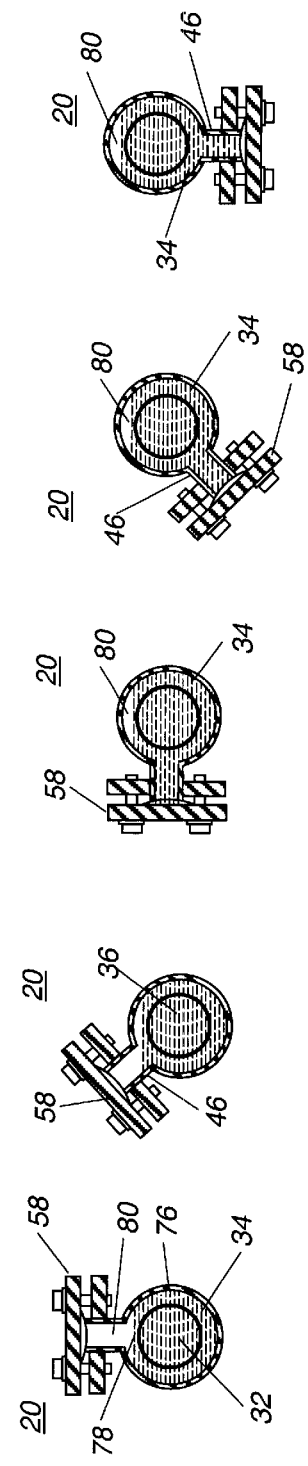

STIMULATED BRILLOUIN SCATTERING CELL HOUSING

GOVERNMENT RIGHTS

This invention relates generally to a stimulated brillouin scattering (SBS) cell for use in a laser system and, more particularly, to an SBS cell for use in a solid state laser system, where the SBS cell includes concentric inner and outer tubes filled with a cell fluid and where the position of the fill hole for the inner tube prevents air bubbles from entering the inner tube.

BACKGROUND OF THE INVENTION

1. Field of the Invention

This invention relates generally to a stimulated brelloulian scattering (SBS) cell for use in a laser system and, more particularly, to an SBS cell for use in a solid state laser system, where the SBS cell includes concentric inner and outer tubes filled with a cell fluid and where the position of the fill hole for the inner tube prevents air bubbles from entering the inner tube.

2. Discussion of the Related Art

Certain laser systems employ a stimulated brillouin scattering (SBS) cell that is used to provide beam waterfront cancellations to correct for optical distortions. The SBS cell is positioned within the laser system so that the laser beam is first directed through the cell, and this is reflected back through the cell by a reflector. The SBS cell is filled with a fluorinated cell fluid that provides a certain desirable phase conjugation optical interaction with the beam. This phase conjugation provides auto-alignment, significantly relaxes stability requirements of the laser optics, and provides wavefront cancellation to correct optical distortions. The operation of an SBS cell of this type is well understood to those skilled in the art.

The SBS cell must include an air cavity to operate effectively. Air trapped within the SBS cell provides a compressible volume that the fluid can expand into as temperature increases. Vibrations and acoustical loads within the cell cause the air and cell fluid to mix which generates air bubbles that induce a refractive index gradient within the fluid. If the bubbles in the fluid are in the path of the beam, the refractive index gradient compromises the auto-alignment and wavefront distortion properties of the fluid, which may lead to laser breakdown during operation. Therefore, it is necessary that the laser be operated under minimal vibrations, or suitable damping be provided to prevent agitation of the cell. Additionally, the SBS cell must isolate the fluid from thermal gradients that may also act to induce refractive index gradients. This can also lead to laser breakdown during operation.

Airborne laser illuminator systems are known in the art that are mounted on aircraft for target detection and tracking purposes. During normal flight conditions, the SBS cell associated with such laser systems may be subjected to significant vibration and acoustical loads, as well as temperature variations, as a result of normal flight conditions. Currently available damping systems that may be applicable for vibration damping for a ground based system are ineffective in this environment.

What is needed is a modified SBS cell that prevents air pockets, fluid distortions and the like from affecting the cell fluid under normal operating conditions. It is therefore an objection of the present invention to provide such an SBS cell.

SUMMARY OF THE INVENTION

In accordance with the teachings of the present invention, an SBS cell is disclosed for use in combination with a laser system on a mobile platform. The SBS cell includes concentric inner and outer tubes that define concentric inner and outer chambers, where the laser beam propagates down the inner chamber. The inner tube is completely filled with an SBS fluid and the outer tube is filled to a level that is above the fill hole of the inner tube. The outer tube is sized to trap enough air to provide a suitable compressible volume for cell fluid expansion resulting from temperature changes in the laser environment. The SBS cell is filled in an upside-down position, and the cell is then rotated 180 degrees to its operating position. In the operating position, the fill hole is pointed downward, and since the air bubbles will float to the top, the distance from the inner tube fill hole and the trapped air bubbles is sufficient enough to prevent air bubbles from migrating to the fill hole and entering the inner tube. Without air bubbles within the inner tube, the sloshing of the fluid within the cell from vibrations does not create an index of refraction gradient in the inner tube that would affect the optical beam.

Additional objects, advantages and features of the present invention will become apparent from the following description and appended claims, taken in conjunction with the accompanying drawings.

BRIEF DESCRIPTION OF THE DRAWINGS

FIG. 3 is a lengthwise cross-sectional view of the SBS cell removed from the laser system shown in FIG. 1; and FIGS. 4(a)–4(e) show successive end views of the SBS cell as it is rotated from a fill position to an operational position, according to an embodiment of the present invention.

DETAILED DESCRIPTION OF THE PREFERRED EMBODIMENTS

The following discussion of the preferred embodiments directed to an SBS cell for use in a solid state laser is merely exemplary in nature, and is in no way intended to limit the invention or its applications or uses.

Figure 1:
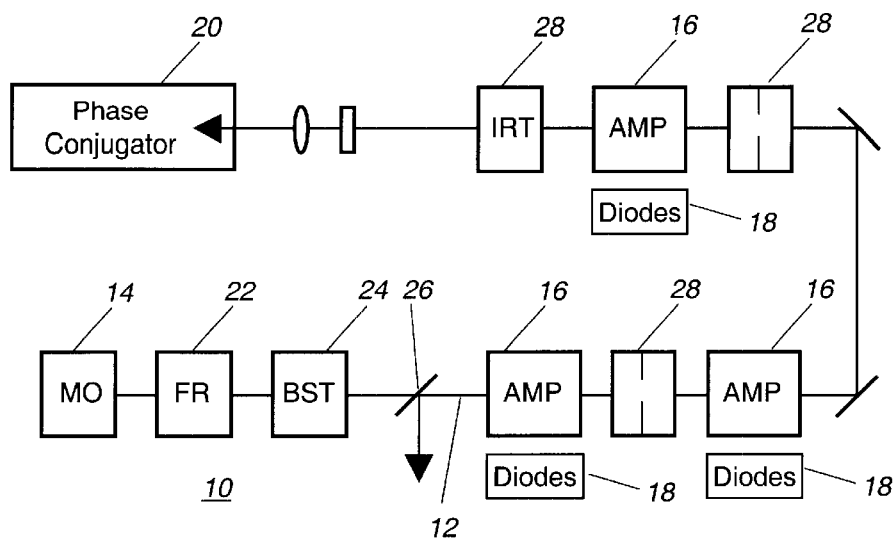
FIG. 1 is a plan view of a laser system employing an SBS cell, according to an embodiment of the present invention.

FIG. 1 is a plan view of a laser system 10 including an SBS cell 20 that provides beam wavefront phase conjugation, according to an embodiment of the present invention. As will be discussed below, the SBS cell 20 is modified over known SBS cells so that an optical beam 12 generated by the system 10 propagates through the cell 20 in a region that will not include trapped air bubbles caused by vibration of the laser system 10. The laser system 10 includes a master oscillator 14 that generates the beam 12 to be amplified by a series of laser amplifiers 16. In this embodiment, the laser system 10 is a solid state laser system where the amplifiers 16 are optical slabs and the amplification sources are diode arrays 18. The beam from the master oscillator 14 is directed through a Faraday isolator 22 that provides polarization control of the beam 12, and then through a beam shaping telescope (BST) 24 that provides desirable beam shaping. A polarizer 26 also provides polarization correction, and image relay telescopes 28 retain uniform intensity beam at key positions in amplifier optical train. The optical beam 12 enters the SBS cell 20 and is reflected by the liquid to window interface and window anti-reflective coating therefrom to be directed back along the optical path and exit the laser system 10 from the polarizer 26. The laser system 10 is just an example of the many types of laser systems that can use the SBS cell 20 of the invention, and is particularly intended to represent a laser system on an aircraft for target detection and tracking.

Figure 2:
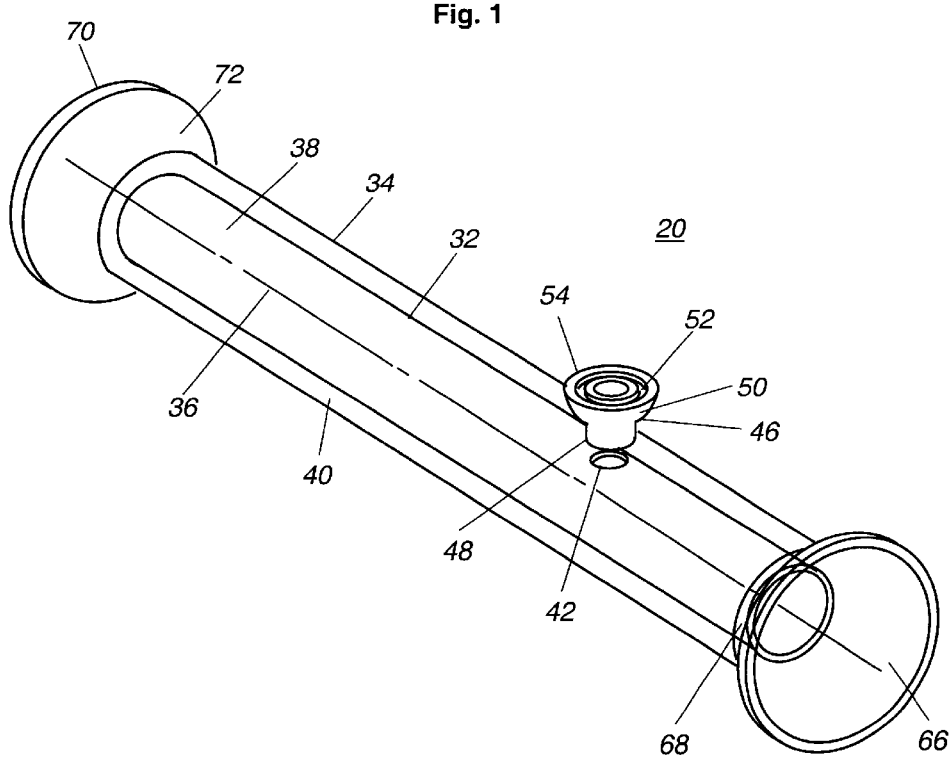
FIG. 2 is a perspective view of the SBS cell removed from the laser system shown in FIG. 1.

FIG. 2 is a perspective view, FIG. 3 is a lengthwise cross-sectional view and FIG. 4(a) is an end view of the SBS cell 20 removed from the laser system 10. The SBS cell 20 includes an inner tube 32 and outer tube 34 that are concentric about a cell axis 36. The inner tube 32 defines an inner chamber 38 and the outer tube 34 defines an outer chamber 40 between the inner tube 32 and the outer tube 34, where the chambers 32 and 40 are concentric with each other. The inner tube 32 includes a fill hole 42 so that the inner chamber 38 is in fluid communication with the outer chamber 40. In this embodiment, two concentric tubes are used because of size limitations. In other embodiments, more concentric tubes may be employed to further provide air fluid separation, or other chamber shapes can be used.

Additionally, the cell 20 includes a fill tube 46 that extends through the outer tube 34, and is aligned with the fill hole 42. The fill tube 46 includes a neck portion 48 and a widened upper portion 50. A annular groove 52 is formed in a fill end 54 of the tube 46. An O-ring 56 is positioned within the groove 52 and allows the chambers 38 and 40 to be sealed by a sealing clamp 58. The sealing clamp 58 includes plates 60 and 62 that are bolted together by bolts 64 around the upper portion 50 of the fill tube 46 to cause the plate 60 to push against the O-ring 56.

The SBS cell 20 includes a meniscus lens 66 attached to one end of the tubes 32 and 34 by a conical portion 68, as shown. Additionally, the SBS cell 20 includes an optical window 70 attached to an opposite end of the tubes 32 and 34 by a conical portion 72. The light beam 12 (FIG. 1) enters the cell 20 through the lens 66, propagates down the inner chamber 38 and is reflected off of the window 70 at an opposite end of the cell 20. The return beam exits the cell 20 through the meniscus lens 66 to propagate back through the laser system 10.

The combination of the inner tube 32 and the outer tube 34 allows the inner chamber 38 to become completely filled with a cell fluid 76, so that the inner chamber 38 is free from air bubbles even if the cell 20 is vigorously shook. The cell 20 is filled through the fill end 54 of the fill tube 46 so that the fluid 76 pours directly into the fill hole 42 and fills the inner chamber 38. Once the inner chamber 38 is filled, the fluid 76 begins spilling into the outer chamber 40. The cell 20 continues to be filled to a fill line 78, where the outer chamber 40 is almost full, and an air pocket 80 remains. After the cell 20 is filled to the fill line 78, the clamp 58 is connected to the fill tube 46 around the upper portion 50 and sealed against the O-ring 56. With the clamp 58 in place, the fluid 76 is prevented from spilling out of the cell 20.

As shown in FIGS. 4(b)–4(e), the cell 20 is then rotated 180° about the axis 36 until the fill tube 46 and 42 extends in a downwardly direction. As the cell 20 rotates, the air pocket 80 moves around the outer chamber 30. In the operation position shown in FIG. 4(e), the fill tube 46 is filled with the cell fluid 76, and the air pocket 80 is formed in the outer chamber 34 opposite the fill tube 46 and 42, as shown. The fill hole 42 is pointing downward, and since the air bubbles will float to the top, the distance from the fill hole 42 to the trapped air bubbles is sufficient enough to prevent air bubbles from migrating to the fill hole 42. Since there is a physical boundary between the inner and outer chambers 38 and 40, the fluid 76 in the inner chamber 38 is isolated from the fluid 76 in the outer chamber 40.

The material used to make the SBS cell 20 must be free of contamination sources. In this embodiment, fused silica is the material used to make the inner and outer tubes 32 an 34, and glass fusion is used to join the tubes 32 and 34. By joining the fused silica in this way, no foreign materials are introduced into the cell 20. The lens 66 and the window 70 are mounted and sealed to the tubes 32 and 34 using polytetrafluoroethylene and encapsulated O-rings. The lens 66 and the window 70 geometries are such that the cell fluid 76 only wets fused silica and polytetrafluoroethylene. By avoiding the introduction of foreign materials, the chance of contaminating the cell fluid 76 is greatly reduced. This is very important because the mechanism of contamination of the cell fluid 76 is not fully understood. Clamp 58 has a fused silica insert such that the fluid is isolated from the clamp 58 material.

Special considerations are given to mounting the cell to an optical bench associated with the laser system 10. In one application, the bench is made of an aluminum material. The co-efficient of thermal expansion of aluminum and fused silica are different. This difference can cause the cell 20 to move after several thermal cycles. The motion of the lens 66 must be controlled to keep the focus point from moving. The motion between the fuse silica and aluminum cannot be over-constrained since this could induce failure type stresses within the SBS cell housing material. The SBS cell 20 is mounted such that its forward end is fixed to the bench. This location was chosen since the forward end is where the lens 66 is attached, and lenses are sensitive to motions along the laser beam axis. Another support is provided at the other end of the outer tube 34. This support is a radial support that permits the SBS cell 20 to slide as a cell optical bench move relative to each other. The aft support can also be comprised of a flexure to permit motion along this axis.

The cell 20 is concentric in construction to provide a good thermal insulation between the fluid 76 within the inner tube 32 and the outer tube surface. Low thermal conductivity materials are used for the SBS cell supports. The cell 20 can be mounted to a water cooled optic platform (not shown) that stabilizes the cell's environment.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A stimulated brillouin scattering cell comprising:
   an outer cell body, said outer cell body including a fill tube;
   an inner cell body positioned within the outer cell body cell, said inner cell body defining an inner chamber, and said inner cell body and said outer cell body defining an outer chamber therebetween, said inner cell body including an opening so that the inner chamber is in fluid communication with the outer chamber, wherein the inner chamber and the outer chamber include a fluid and said outer chamber includes an air pocket, said opening being oriented relative to the air pocket so that air bubbles do not enter the inner chamber; and
   a lens mounted to one end and a window mounted to the other end.

2. The scattering cell according to claim 1 wherein the inner cell body and the outer cell body are concentric cylindrical cell bodies.

3. The scattering cell according to claim 1 wherein the fill tube and the opening are aligned, and the fill tube is pointed in a downwardly direction so that the air pocket is opposite to the opening.

4. The scattering cell according to claim 1 further comprising a sealing device, said sealing device sealing the fill tube and preventing fluid from coming out of the outer chamber.

5. A laser system for generating a laser beam, said system comprising:
   a laser source for generating the laser beam, said laser source directing the laser beam along a beam axis; and
   a stimulated brillouin scattering cell positioned on the beam axis and receiving the laser beam, said cell including an outer cell body and an inner cell body positioned within the outer cell body cell, said inner cell body defining an inner chamber, and said inner cell body and said outer cell body defining an outer chamber therebetween, said inner cell body including an opening so that the inner chamber is in fluid communication with the outer chamber, wherein the inner chamber and the outer chamber include a fluid and said outer chamber includes an air pocket, said opening being oriented relative to the air pocket so that air bubbles do not enter the inner chamber.

6. The system according to claim 5 wherein the outer cell body includes a fill tube in fluid communication with the outer chamber, said fill tube receiving a fluid to fill the inner and outer chamber.

7. The system according to claim 6 wherein the fill tube and the opening are aligned, and the fill tube is pointed in a downwardly direction so that an air pocket within the outer chamber is opposite to the opening.

8. The system according to claim 5 wherein the inner cell body and the outer cell body are concentric cylindrical cell bodies.

9. The system according to claim 6 wherein the cell further includes a sealing device, said sealing device sealing the fill tube and preventing fluid from coming out of the outer chamber.

10. The system according to claim 5 wherein the cell further includes a lens mounted to one end and a window mounted to the other end.

11. A laser system for generating a laser beam, said system comprising:
    a laser source for generating the laser beam, said laser source directing the laser beam along a beam axis, and
    a stimulated brillouin scattering cell positioned on the beam axis and receiving the laser beam, said cell including a cylindrical outer cell body and a cylindrical inner cell body positioned within the outer cell body cell and being concentric therewith, said inner cell body defining an inner chamber and said inner cell body and said outer cell body defining an outer chamber therebetween, wherein the outer cell body includes a fill tube in fluid communication with the outer chamber, said inner cell body including an opening aligned with the fill tube so that the inner chamber is in fluid communication with the outer chamber, wherein the inner chamber and the outer chamber are filled with a fluid through the fill tube so that the outer chamber includes an air pocket, said opening being oriented relative to the air pocket so that air does not enter the inner chamber, said cell further including a sealing device that seals the fill tube to prevent the fluid from coming out of the cell.

12. The system according to claim 11 wherein the cell further includes a lens mounted to one end and a window mounted to the other end.

\* \* \* \* \*